United States Patent Office 3,068,307
Patented Dec. 11, 1962

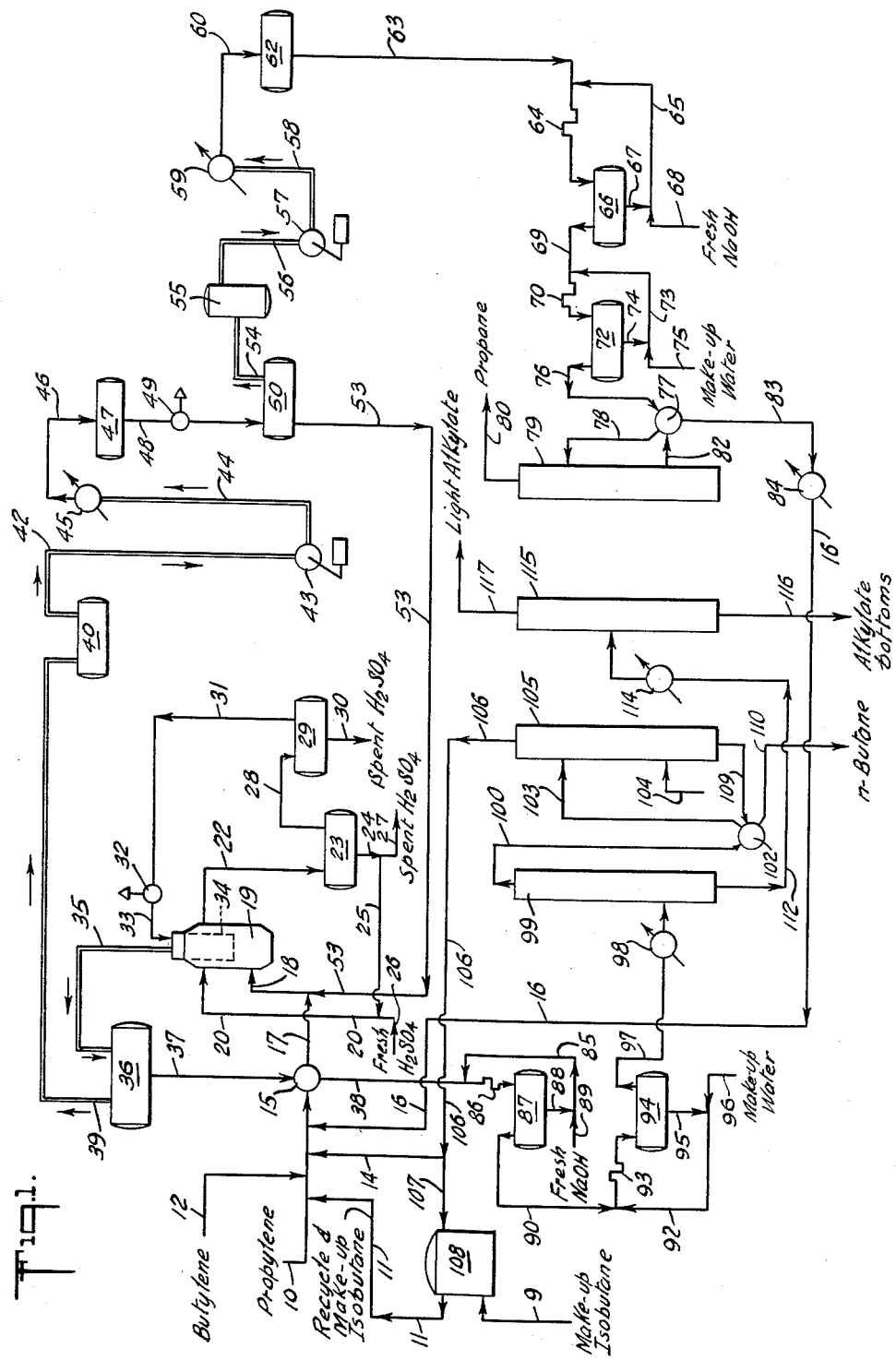

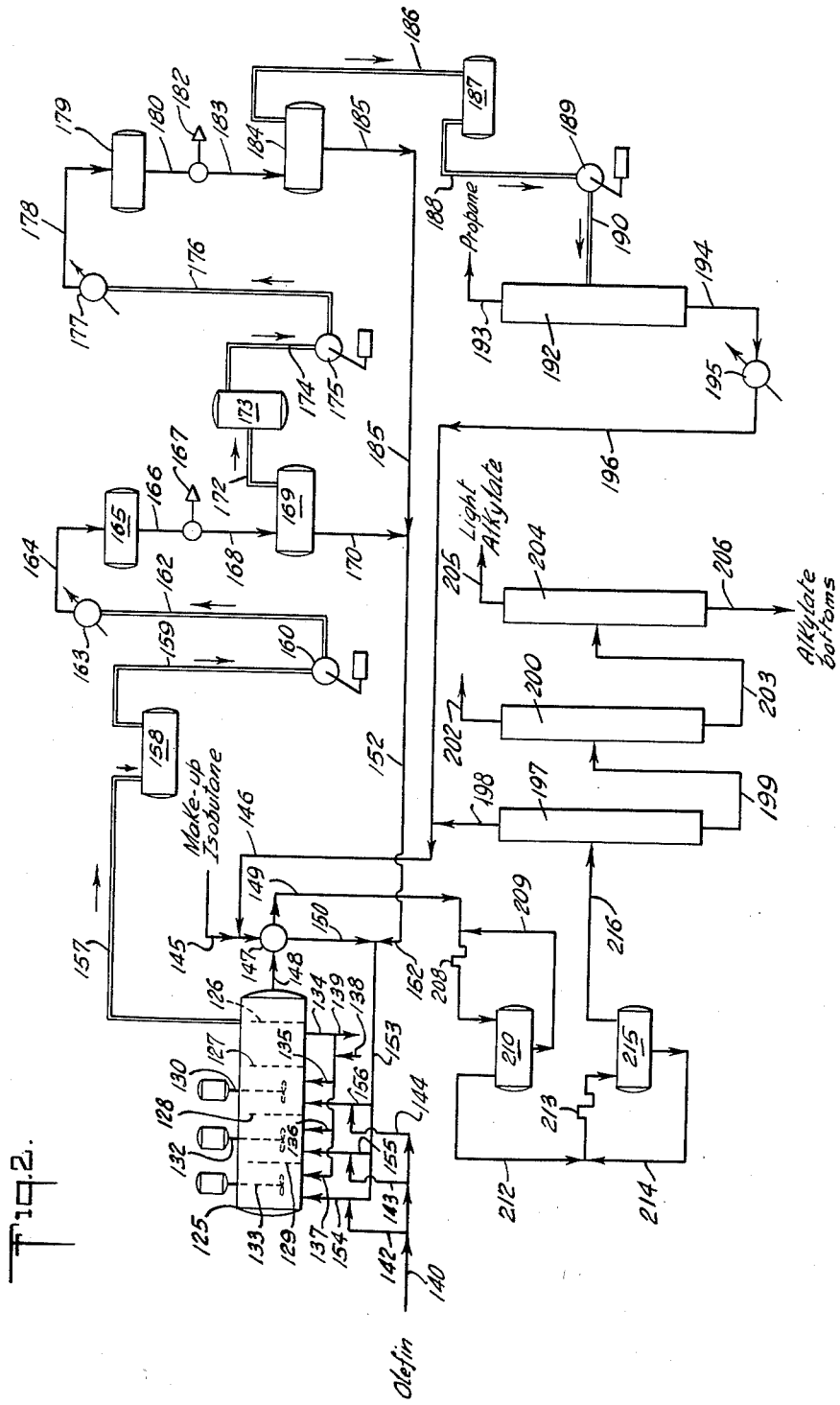

3,068,307
ISOBUTANE-OLEFIN ALKYLATION PROCESS WITH FLASH CONCENTRATION OF DEPROPANIZER FEED
Randlow Smith, New Rochelle, N.Y., assignor to Texaco Inc., a corporation of Delaware
Filed June 27, 1958, Ser. No. 745,064
1 Claim. (Cl. 260—683.62)

This invention relates to catalytic isobutane-olefin alkylation with a liquid catalyst, and more particularly to such alkylation process employing flash concentration of depropanizer feed.

By the terms "flashing" and "flash evaporation" in this specification I mean the reduction of pressure on a liquid hydrocarbon phase with the attendant substantially adiabatic vaporization of volatile materials and temperature reduction of the resulting liquid and vapor phases.

In the past proposals were directed principally to isobutane-butylene alkylation for making predominantly aviation alkylate. Now commercial alkylation of propylene has assumed increasing prominence because of the growing demand for alkylate automotive engine fuels. Alkylation of olefins containing a substantial fraction of propylene, e.g. a third or more propylene based on total olefins fed to process (and ordinarily promoted by at least 10–25% butylenes) gives many more problems than alkylation of olefinic feed preponderating in $C_4+$ olefins to the practical exclusion of propylene. Reasons for this include that there is roughly 25+% greater molal heat of reaction for propylene alkylation with isobutane than butylene alkylation with isobutane, and commercial propylene stocks generally obtainable in oil refineries usually have 5 to 15 times more propane (or even greater amounts) in them than the $C_4+$ olefin-containing stocks have.

As one of the principal factors for making high quality alkylate is the maintenance of a very high ratio of isobutane to total hydrocarbons in the reaction mixture, e.g. 70+ mol percent of the total hydrocarbons being isobutane, it can be understood that the problem of rejection of propane diluent from the system becomes increasingly greater and more important when propane content of the olefin feed increases. Thus, for each barrel of diluent propane fed to the reaction zone, a very much larger quantity of pure isobutane must be supplied to the reactor (about 2½ barrels) to maintain the desired high isobutane:hydrocarbon ratio, yet this extra processed isobutane adds nothing to the product output of the plant. Thus, for maintenance of 80% isobutane in the reacted mix, 4 barrels of pure isobutane must be supplied to the reactor for every barrel of propane diluent.

A further important factor for making high quality alkylate is the maintenance of a low temperature in the reaction mixture, that is, not more than 75° F., advantageously not more than about 55° F. and preferably even colder, e.g. 30–45° F.

Most alkylation plants are self-refrigerated units (that is for example, by use of an effluent refrigeration system wherein the effluent from the alkylation zone is separated into a hydrocarbon phase and an acid phase, the separated hydrocarbon phase is passed through a flash zone of lower pressure wherein lower boilers including some isobutane are vaporized with concomitant cooling of the remaining liquid hydrocarbons including alkylate, and at least part of the cooled remaining liquid hydrocarbons are used to refrigerate the reaction zone indirectly—or by use of a so-called "autorefrigeration" system wherein the lower boiling hydrocarbons including isobutane are evaporated directly from the alkylation reaction zone to cool it). Compression suction pressure in such plants is generally not permitted to go substantially below atmospheric so as to prevent the dangerous inlet of air into the system. Thus, for a given hydrocarbon liquid composition, this atmospheric pressure limitation regulates the temperature to which the remaining liquid can be self-cooled by expansion. Furthermore, subatmospheric pressure vapor handling systems must be large because of the lower density of the vapors, and are costly.

Further limitations when using indirect cooling in such plants are, of course, the amount of cooling surface which can be put into a heat exchanger and still leave adequate room for satisfactory fluid flow in the exchanger, the pressure drop of circulating fluids, and the closeness of temperature approach obtainable between fluids in exchanging heat when operating at economic rates of flow.

Use of my invention has these two significant advantages over prior related schemes: it permits depropanizer feed concentration to practically any desired degree; and it provides an additional body of chilled isobutane-rich liquid for recycle into the reaction zone and direct cooling thereof, thus permitting attainment of the most desirable low temperatures, e.g. below 55° F. and in the preferred 30–45° F. range, in fairly simple and economical manner.

Also, it is to be noted specially here that, with each successive depropanizer feed concentration, the depropanizer feed becomes richer and richer in materials boiling below that of isobutane. This permits making of successively colder bodies of chilled isobutane-rich liquid by the supplemental flashing to a given compressor suction pressure. It is to be noted further in my process that no compressor feeds are made to handle recycle isobutane which would lower the vapor pressure of the resulting compressor condensate and thus work against concentrating the light ends by flashing such compressor condensate.

The present invention relates to an improvement in a process for catalytic isobutane-olefin alkylation wherein isobutane in molar excess and olefinic feed stock containing propane are contacted in liquid phase in an alkylation zone with a liquid catalyst under alkylating conditions, and alkylation zone refrigeration is obtained by evaporation of lower boiling components including isobutane and propane from the resulting hydrocarbon mixture, e.g. systems employing effluent refrigeration or autorefrigeration. In accordance with this invention the evaporated lower boiling components are totally condensed to form an isobutane-rich condensate; the isobutane-rich condensate is supplied as the feed to a supplemental flash zone wherein it is subjected to flash evaporation where there is formed a flashed vapor phase richer in components having vapor pressure above that of isobutane than is said feed condensate and, concomitantly, a chilled residual liquid phase which is richer in isobutane than is the feed condensate. The chilled residual liquid phase from the supplemental flash zone is returned to the alkylation zone thereby supplying additional concentrated isobutane and direct reaction zone cooling.

The flashed vapors from the supplemental flash zone can be depropanized by fractional distillation in conventional fashion to remove propane as an overhead and to provide a liquid bottoms fraction thus enriched in isobutane, also suitable for recycling to the alkylation zone. Alternatively, the flashed vapor from the supplemental flash zone can be condensed and reflashed in a second supplemental flash zone; this procedure, of course, can be repeated a plurality of times with the condensed flashed vapor from the immediately preceding flash zone being supplied as feed to the next supplemental flash zone. Each successive flashing provides a body of chilled liquid phase isobutane concentrate for recycle to the reaction zone. Additionally, each successive flashing serves to concentrate the diluent propane and lighter (i.e. lower boiling) materials, non-condensables, etc., so that investment in depropanizer fractional distillation facilities can be minimized or left unchanged, even when an isobutane-butylene plant is being adapted to handling increasing amounts of propylene olefin feed with attendant increase in propane contamination.

As applied to an effluent refrigeration alkylation operation the alkylation reaction mixture is continuously withdrawn from the reactor and separated into a liquid hydrocarbon effluent phase and a liquid catalyst phase. The liquid hydrocarbon effluent phase is supplied as feed to a primary flash zone wherein lower boiling components including isobutane and propane are evaporated from said liquid hydrocarbon effluent with concomitant production of a chilled remaining liquid phase. At least part of said chilled remaining liquid phase is used as heat exchange medium to assist in controlling temperature in the alkylation zone with attendant generation of additional hydrocarbon vapors comprising isobutane. These additional hydrocarbon vapors and the evaporated lower boiling components from primary flashing, which include isobutane and propane, are withdrawn from contact with associated liquid phase materials, then totally condensed to form the isobutane-rich condensate for the first supplemental flashing.

As applied to an autorefrigeration alkylation operation, the lower boiling hydrocarbons including isobutane and propane which are evaporated off the reaction mixture are compressed and totally condensed, then flashed to create a propane-enriched vapor phase and an isobutane-enriched chilled liquid phase, the latter being returned to the reaction mixture to assist in refrigerating the reaction zone and to supply isobutane thereto. The vapor phase from flashing can be depropanized or, alternatively compressed and totally condensed again, then reflashed and so on with the ultimate vapor phase being depropanized and the chilled remaining liquid from the several flashings being recycled to the reaction zone.

Where a plurality of supplemental flash zones are employed in the practice of the invention, it is necessary to condense, e.g. by compression and cooling, the feed to each of the supplemental flash zones. Thus, the flashed vapor phase separated from all the zones up to the penultimate flash zone must be condensed. The flashed vapor from the last flash zone need not be condensed, but can be fed to a depropanizing fractional distillation in the vapor phase. However, for convenience in handling and neutralizing sour degradation products such as sulfur dioxide and the like in the flashed vapor from the ultimate flash zone, I prefer to condense the last separated flashed vapor phase and remove acidic substances therefrom before depropanizing. Accordingly, water, etc. trapped on depropanizer trays from periodic hydrostatic testing of the equipment does not give rise to corrosive substances and so damage this expensive fractional distillation equipment.

The removal of acidic substances from the propane-rich condensate from the last supplemental flash zone is most conveniently done by treating it with caustic soda solution, then water washing. Other methods also can be used, such as adsorption of sour degradation products on bauxite, clay, or the like, or chemical conversion of the sour substances into innocuous materials, e.g. by reduction.

FIGURE 1 of the drawings is a flow diagram showing how my invention has been adapted to a commercial alkylation reactor system employing effluent refrigeration with one or more alkylation zones of the internal recirculation type, i.e., the so-called Stratco contactor, wherein chilling of the reaction mixture emulsion is affected by circulating chilled effluent through a heat exchanger immersed in the emulsion inside the alkylation zone. While it should be understood that more than one such contactor can be used in series or in parallel flow with the others, a single contactor is represented in the drawing for purposes of simplicity and clarity. Also, for the sake of simplicity and clarity, tanks, compressors, towers, and similar equipment units are shown in the singular, but it will be understood that such units can consist of a plurality of items in parallel or in series arrangement. While the contactor is shown in the vertical, it will be understood that horizontal contactor implacement also can be used.

Also to be understood is that other conventional reactor types such as the pump and time tank reactor type can be used in place of the agitated contactor. In such system the alkylation zone comprises ordinarily a baffled holding tank from which a portion of reaction mixture is withdrawn and circulated by pump through an external heat exchanger, then back to the holding tank. Contact time of 5–45 minutes and, advantageously, 5–20 minutes is usual in such units.

Because the drawings are schematic, pumps, reboilers, condensers, reflux returns, instruments, and most valves are not illustrated but are to be supplied wherever necessary or desirable.

Referring to FIGURE 1, olefin feeds to the system are introduced in lines 10 and 12 and isobutane recycle and make-up feeds to the system through lines 9, 11, 14, 16, and 53. The olefin feed stream can be a $C_4$ cracking gas fraction containing butanes and butylene and termed "B—B feed," but preferably it will be a mixed $C_3$–$C_4$ olefin feed containing at least about ⅓ propylene and generally 60–90 mol percent propylene (relative to all other olefins present). In such case, about 10 to 30 mol percent of the total olefins fed to the process are butylenes for the promotion of the propylene alkylation. Such feed will ordinarily contain sufficient propane diluent to amount to at least about 3 mol percent propane based on the total mols of fresh hydrocarbons fed to the alkylation zone (excluding recycle hydrocarbons) and will frequently have as much as 10% to 20% propane (same basis).

The hydrocarbon feeds from lines 10, 11, 12, 14, and 16 are passed into heat exchanger 15 wherein they are chilled by indirect heat exchange with separated remaining liquid phase from the primary flashing, supplied by line 37. The so-chilled feed hydrocarbons are then passed through line 17 into mixture with separated chilled residual liquid (also preponderantly isobutane) being recycled in line 53 from the supplemental flash zone, hereinafter described.

The combined feed is introduced into contactor 19 through line 18, together with a flow of recycled separated catalyst phase entering the contactor through line 20 after having been made up to desired strength by introduction of fresh catalyst in line 26.

The liquid catalyst-hydrocarbon volume ratio in the contactor is maintained preferably at about 1:1 when sulfuric acid is used as catalyst, and make-up 98–99.5% $H_2SO_4$ is added to keep the system acid at about 88–94% strength (titratable acidity). The mol ratio of isobutane to olefin supplied to the contactor (including isobutane recycle) is substantially in excess of 1:1 and generally is between about 4:1 to 10:1. Instead of sulfuric acid, other liquid alkylation catalysts which are substantially non-volatile under conditions at which the lower boiling components including isobutane and propane are evaporated from the reactor effluent for refrigeration can be employed, e.g. aluminum chloride-hydrocarbon complex liquid.

In the contactor and in the catalyst settlers (items 23 and 29, following), the pressure is maintained sufficiently high to keep all components in the liquid phase. The temperature of the alkylation zone is maintained generally below about 75° F. and preferably between about 35 and 55° F. For isobutane-butylene alkylation the reactor pressure generally will be about 35 p.s.i.g. and, for butylene-promoted propylene-isobutane alkylation, it will be somewhat higher, usually e.g. 40 to 60 p.s.i.g. It will be understood however, that the temperature and the pressure can be maintained higher or lower as is necessary or desirable to obtain smooth operation regardless of the reaction mixture being employed.

The contactor emulsion output passes through line 22 into primary separator 23 wherefrom liquid catalyst phase is withdrawn by means of line 24 and recirculated to the contactor through line 25. Catalyst purge is removed through line 27 in an amount substantially equal to the input of fresh catalyst through line 26 to maintain catalyst volume substantially constant throughout the operation.

The separated liquid hydrocarbon effluent phase is passed through line 28 into catalyst aftersettler 29 wherein additional liquid-liquid partition takes place, the so-separated catalyst being withdrawn through line 30. This catalyst can be recycled to contactor 19 by means not shown. Use of the aftersettler permits greater throughput and shorter holding time in primary settler 23, this being to the benefit of overall alkylate quality. Hydrocarbon effluent is withdrawn from the aftersettler through line 31 and passed through pressure reducing means 32, preferably an automatic valve maintaining constant upstream pressure of a predetermined value which is that required to prevent vaporization and cavitation in the contactor. Other pressure reducing means can be used, e.g. valves, orifices, venturi nozzles or the like.

The primary flashing to about 1–5 p.s.i.g. creates a chilled vapor and liquid mixture which is passed into the head of the contactor and through internal cooling coils 34. Additional hydrocarbon vapors are generated as the reacting mixture is so cooled. The resulting mixed liquid and vapor stream is removed through line 35 and passed into debutanizer charge drum 36. Herein the chilled remaining liquid phase is separated from vapors and sent via line 37 to precool the hydrocarbon feeds in exchanger 15, then withdrawn through line 38 for neutralization and fractional distillation hereinafter described.

It is significant to point out here that the chilled vapor-liquid separation from the flashing can take place prior to refrigerating the contactor, and the separated chilled liquid phase alone can be used to supply cooling coils 34.

Returning to the drawing, vapors from debutanizer charge drum 36 are passed through line 39 into knockout drum 40, then through line 42 into the suction of compressor 43. For safety reasons the suction of compressor 43 is generally operated just slightly above atmospheric pressure so as to avoid introduction of atmospheric oxygen into the system. Compressed vapors pass through line 44 into condenser 45, and the resulting condensate is introduced into accumulator drum 47 by line 46. The condensate passes from the accumulator drum through line 48, then through pressure reduction means 49 (similar in construction to item 32, hereinbefore described). The vapor-liquid mixture resulting from this supplemental flashing is separated into vapor and liquid phases in drum 50, the liquid phase being returned to the contactor through lines 53 and 18 and the separated flashed vapor phase passing through line 54 into knockout pot 55. The vapors from pot 55 pass through line 56 into the suction of compressor 57, operated similarly to compressor 43, hereinbefore described. The compressed vapors pass through line 58 into condenser 59, and the resulting condensate is withdrawn through line 60 for storage in depropanizer charge drum 62. As the vapors entering compressor 57 are quite cold, compression efficiency is high. It is to be noted that no isobutane-containing recycle flow to either compressor suction is used. This allows a positive removal of propane from the system coupled with the greatest concentration of propane by the successive flashings.

It will be understood here that a plurality of supplemental flashings can be employed (using pressure reduction means as hereinbefore described) on the condensed flashed vapor phase from the immediately preceding flash zone. However, one subsequent flashing is generally adequate for the economical and efficient concentration of propane and other light ends and is, accordingly, preferred.

While the vapor phase separated from the ultimate flashing can be fed into a depropanizing fractional distillation as such, in the preferred instance illustrated the condensed phase is withdrawn from depropanizer charge drum 62 by line 63 and passed into caustic washer 64, together with a circulating flow of aqueous sodium hydroxide solution entering from line 65. Discharge from the washer flows into separator 66. Settled aqueous caustic is withdrawn from separator 66 by means of line 67, purged of spent caustic solution by means not shown, and made up with fresh caustic solution entering line 68. The caustic-treated hydrocarbon phase is withdrawn through line 69 and washed in mixer 70 with a circulating flow of water entering line 73. The discharge from mixer 70 flows into separator 72, settled aqueous phase is withdrawn therefrom by means of line 74, purged by means not shown, and made up with fresh water entering line 75. The washed hydrocarbon phase is withdrawn through line 76, passed into heat exchanger 77 wherein it is warmed by indirect heat exchange with depropanizer bottoms, then introduced into depropanizer 79 by means of feed line 78.

The depropanizer is operated in conventional manner to give a fractional distillation of propane as an overhead product withdrawn from line 80 and, sharply cut therefrom, a liquid bottoms fraction of isobutane practically denuded of propane and lighter materials. The bottoms fraction is withdrawn through line 82, passes through heat exchanger 77 wherein it is cooled, then further cooled by passing it through line 83 into cooler 84. Optionally, flashing of the depropanizer bottoms can be done at this point by equipment not shown to create an additional supply of refrigerant for cooling the alkylation reactor or feeds thereto. The cooled depropanizer bottoms pass through line 16 for recirculation as an isobutane-rich feed to the alkylation reaction zone.

The liquid separated in the debutanizer charge drum, having been utilized as a coolant in exchanger 15, passes through line 38 and mixer 86, the latter with a recirculated stream of caustic soda solution entering line 85, then sent to settler 87. Settled aqueous caustic solution is withdrawn from tank 87 by means of line 88 and purged by means not shown. Fresh make-up caustic solution is introduced via line 89. Separated hydrocarbon phase is then passed through line 90 into mixer 93 with a recirculated stream of wash water entering line 92. The discharge from this mixer enters settler 94. Wash water is withdrawn from the separator by means of line 95 and purged by means not shown. Fresh make-up water for the washing is introduced by means of line 96.

Separated washed hydrocarbon phase is withdrawn from tank 94 by means of line 97, heated in heater 98, and introduced into product debutanizer 99, a fractional distillation unit operated in conventional fashion. If desired heater 98 can be placed ahead of mixer 93, a hot water wash helping to prevent fouling of the subsequent fractional distillation equipment. From the debutanizer an overhead product consisting mainly of $C_4$ and lighter hydrocarbons is withdrawn through line 100, warmed in exchanger 102 by indirect heat exchange with deisobutanizer bottoms, obtained as hereinafter described, and introduced into the deisobutanizing fractional distillation tower 105 by feed line 103. Also fed into tower 105 is a supplementary hydrocarbon feed entering line 104, the supplementary hydrocarbon feed supplying fresh isobutane and some normal butane to the system.

Deisobutanizer 105 is operated to give a liquid bottoms fraction of normal butane and heavier which is withdrawn through line 109, exchanger 102, and discharge line 110. The fractional distillation in tower 105 is generally operated to give a sharp separation, and the isobutane and lighter distillate therefrom is withdrawn through line 106. A portion of the distillate is directed back to the alkylation zone using line 14. The balance of the deisobutanizer overhead passes through line 107 into storage vessel 108; this vessel is also supplied with fresh make-up isobutane from other refinery sources. Isobutane is supplied to the alkylation zone as hereinbefore described through line 11 out of tank 108, this isobutane-rich feed usually being supplied in sufficient quantity to maintain a substantially constant isobutane content in the overall alkylation zone feed.

The liquid bottoms fraction from product debutanizer 99 is withdrawn through line 112, passed through heater 114, and introduced into final fractionator 115. Herein the desired light alkylate for aviation or automotive fuel used is fractionally distilled from a higher boiling fraction, the light alkylate being withdrawn from the system through distillate line 117, and the heavy alkylate ("alkylate bottoms") discharged from the system through line 116. Any heavy fraction is cooled by means not shown and stored, e.g. for cracking stock. When operating for motor fuel production the end point is generally sufficiently low and quality of the product sufficiently high so that the final fractionation in tower 115 can be dispensed with.

FIGURE 2 of the drawings shows how my invention can be adapted to an alkylation system of the autorefrigeration type, reaction zone 125 being a representation of a conventional "cascade"-type alkylation reactor which is divided into a plurality of zones by baffles 126, 127, 128, and 129, the last three enumerated baffles forming reaction zones which are agitated by mixers 130, 132, and 133. In this reactor sulfuric acid catalyst settles out between baffles 126 and 127 and is recycled through line 134; while it can be distributed to each of the agitated zones through inlets 135, 136 and 137, preferably it is all sent to the zone agitated by mixer 133. Spent acid is purged from the system through line 139; and make-up high strength acid catalyst is added in inlet 138.

Olefin is fed to the reaction zone through header 140 and sent to the several agitated zones through lines 142, 143, and 144. Make-up isobutane enters the system through line 145 and, together with recycle isobutane obtained as hereinafter described, passes through heat exchanger 147 wherein it is cooled by indirect heat exchange with hydrocarbon effluent leaving the reactor by means of line 148. These chilled feeds are further cooled and the isobutane feed to the reactor augmented by the chilled remaining liquid phase material being recycled from the supplemental flash zones and collected in line 152. This entire isobutane feed then passes through header 153; while it can be distributed to all the agitated zones of the reactor by means of lines 154, 155 and 156, preferably it is all sent to the zone agitated by mixer 133 or even a "preflash" zone (not shown) ahead of this one.

In the reactor 125 the contents are cooled by evaporation of the lighter components comprising isobutane and propane, and resulting vapors pass through line 157 into knockout pot 158, thence through line 159 into the suction of compressor 160. The vapors are compressed and passed through line 162 into cooler 163 wherein they are cooled sufficiently at the compressor discharge pressure to totally condense them. The condensate passes through line 164 into accumulator drum 165, then out line 166 and through pressure reducing valve 167. The resulting mixture of flashed vapor and liquid passes through line 168 into separator 169. Separated chilled isobutane-rich liquor passes through line 170 into line 152 for recycle to the reaction zone.

The separated flashed vapor phase passes through line 172, knockout pot 173, line 174, and into the suction of compressor 175. Herein it is compressed and passed through line 176 into condenser 177. The compression and cooling are sufficient to obtain total condensation of these vapors and the resulting condensate is passed through line 178 into accumulator drum 179. From the accumulator drum the condensate is withdrawn through line 180 and again flashed by passage through pressure reducing valve 182. The flashed vapor-liquid mixture passes through line 183 into separator 184. From this separator additional chilled isobutane-rich liquor is withdrawn through lines 185 and 152 for recirculation to the reaction zone.

The separated vapors from separator 184, having as much as 2 to 3 times the propane concentration as the vapors in line 172, pass through line 186 into knockout pot 187, thence through line 188 into compressor 189. The compressed vapors are fed through line 190 into depropanizer 192. Depropanizer 192 is operated in conventional manner to give a fractional distillation of propane as an overhead product (withdrawn from line 193) and, sharply cut therefrom, a liquid bottoms fraction which is withdrawn through line 194, cooled in cooler 195 and discharged in line 196. The liquid bottoms fraction is essentially isobutane and is practically devoid of propane and lighter materials.

Reactor effluent withdrawn from exchanger 147 through line 149 passes into mixer 208 with recycle aqueous caustic soda for neutralization, and the mixture is discharged into separator 210. Aqueous caustic soda is recycled to the mixture through line 209, fresh caustic soda input and purge caustic soda outlet being provided by means not shown. The neutral crude alkylate is withdrawn through line 212 and passed into mixer 213 wherein it is washed with water, then discharged into separator 215. Water is recycled from the separator to the mixer through line 214, make-up and purge water being provided by means not shown. Water washed neutral crude alkylate is passed through line 216 into deisobutanizer 197.

From the deisobutanizer, by conventional fractional distillation, there is produced an overhead product of concentrated isobutane. This is passed through line 198 and into line 146 for recycle to the reaction zone along with cooled depropanizer bottoms from line 196.

The bottoms fraction from the deisobutanizer, consisting mainly of normal butane and higher molecular weight hydrocarbons, passes through line 199 into product debutanizer 200. From the debutanizer an overhead product consisting mainly of $C_4$ hydrocarbons is withdrawn through line 202, and this fractional distillation is operated to yield a bottoms fraction consisting principally of alkylate.

The debutanizer bottoms fraction is passed through line 203 into final fractionator 204 wherein it is fractionally distilled into a light alkylate, which is withdrawn from the system through line 205, and alkylated bottoms, which are withdrawn from the system through line 206.

The following is given as an example of the present invention, and it represents the design for a 7,366 barrel per day propylene alkylate unit utilizing my invention in connection with effluent refrigeration. Reference is made to FIGURE 1 of the drawing except as where indicated expressly to the contrary. In the following example all flow rates are given in equivalent liquid barrels per hour, all compositions are in mol percent, and all temperatures are in degrees Fahrenheit unless otherwise expressly indicated.

A propylene feed is introduced through line 10 at a charge rate of 252.62 with a composition of 0.11 ethylene, 1.52 ethane, 68.84 propylene, 26.82 propane, 0.50 isobutane, 1.03 butylenes, and 0.18 normal butane. Recycle and make-up isobutane from line 11 is fed at the rate of 207.20, its composition being 2.30 propane, 89.63 isobutane and 8.07 normal butane. Additional recycle isobutane is introduced through line 14 at a rate of 370.69, its composition being 0.044 ethane, 6.092 propane, 91.865 isobutane, and 1.999 normal butane. These hydrocarbons are mixed and passed through exchanger 15 wherein they are cooled by hydrocarbon effluent from debutanizer charge drum 36.

To the cooled mixed feed are added depropanizer bottoms from line 16 flowing at a rate of 225.92 and having composition of 3.54 propane, 92.00 isobutane, 4.28 normal butane, and 0.188 $C_5$ and higher hydrocarbons, and separated chilled residual liquid from supplemental flash zone 50 flowing from line 53 at the rate of 868.23 having composition of 0.166 ethane, 12.085 propane, 81.526 isobutane, 5.320 normal butane, and 0.903 $C_5+$ hydrocarbons. This entire hydrocarbon feed is admitted to contactor 19 through line 18. The reactor hydrocarbon charge flow amounts to 1924.66, and it has composition of 0.017 ethylene, 0.320 ethane, 10.945 propylene, 11.289 propane, 72.790 isobutane, 0.162 butylenes, 4.059 normal butane, and 0.418 $C_5+$ hydrocarbons.

The alkylation reaction zone temperature is maintained about 45°. Make-up 98% $H_2SO_4$ is supplied through line 26 at the rate of 15.5 and, together with recycle $H_2SO_4$ flowing at the rate of 1924.66 in line 25, is passed into the contactor through line 20, thereby giving a hydrocarbon to acid volume ratio in the reaction zone of 1:1 with a maintained system acidity of about 92.0% $H_2SO_4$.

The reactor output is withdrawn through line 22 to primary acid settler 23. Separated acid is recycled through lines 24 and 25, and spent acid is removed from the system at a rate sufficient to maintain total acid volume approximately constant. The separated liquid hydrocarbon effluent phase is passed through line 28 into acid aftersettler 29. Additional acid is separated and withdrawn through line 30 while hydrocarbon effluent of composition 0.364 ethane, 12.910 propane, 70.349 isobutane, 4.614 normal butane, 0.843 isopentane, and 10.920 alkylate is passed through line 31 at the rate of 1838.48. Upstream pressure on reducing valve 32 is 50 p.s.i.g. Pressure is reduced to 5 p.s.i.g. by the valve with resultant flashing of lower boiling components including isobutane and propane. This mixed phase material is passed directly through cooling coil 34 and withdrawn therefrom by means of line 35 with attendant generation of additional hydrocarbon vapors from having refrigerated the alkylation reaction zone.

The liquid phase from drum 36 is separated and passed through line 37 into exchanger 15 at the rate of 662.30, its composition being 0.030 ethane, 4.160 propane, 55.118 isobutane, 4.540 normal butane, 1.532 isopentane and 34.620 alkylate.

The separated vapors are withdrawn through line 39, knockout pot 40, and line 42 into the suction of compressor 43 at a rate of 1176.18, the composition being 0.518 ethane, 16.880 propane, 77.216 isobutane, 4.690 normal butane, and 0.696 $C_5+$ hydrocarbons. These vapors are compressed to a pressure of 130 p.s.i.a. and delivered to condenser 45 by means of line 44. The condensate is discharged into accumulator drum 47 through line 46. It flows out of the drum through line 48 and pressure reducing valve 49. Herein a supplemental flashing takes place, and the liquid and vapors are discharged into drum 50. In this subsequent flashing pressure is reduced to 25 p.s.i.a. whereby the resulting liquid and vapor phases are cooled to a temperature of 28°. Separated liquid is withdrawn from drum 50 through line 53 as hereinbefore described. Flashed vapors pass through line 54, knockout pot 55, and line 56 into the suction of compressor 57 wherein they are compressed to 180 p.s.i.a., delivered through line 58 into condenser 59, and therein condensed into liquid which enters depropanizer charge drum 62 by means of line 60.

The depropanizer charge is caustic washed in mixer 64 and separated in vessel 66 as hereinbefore described. The caustic-treated hydrocarbon is then withdrawn through line 69, water washed in mixer 70, and discharged into vessel 72 as hereinbefore described. The water-washed hydrocarbon is separated from aqueous phase materials and passed through line 76 into indirect heat exchange with depropanizer bottoms in exchanger 77, then introduced into depropanizer 79 through inlet 78 at the rate of 307.95, the depropanizer feed composition being 1.478 ethane, 30.00 propane, 65.402 isobutane, 3.000 n-butane, and 0.130 $C_5+$ hydrocarbons.

An overhead distillate from depropanizer 79 is removed at the rate of 82.03, the composition of this stream being 4.94 ethane, 92.02 propane, and 3.04 isobutane.

The depropanized bottoms stream is withdrawn from the depropanizer through line 82, passed through exchanger 77, withdrawn therefrom by line 83 and cooled in cooler 84 to a temperature of 100°. The cooled bottoms are then recycled in line 16 to the alkylation zone as hereinbefore described.

Hydrocarbon effluent withdrawn from exchanger 15 by means of line 38 is caustic washed in mixer 86 as hereinbefore described and discharged into vessel 87. The caustic washed hydrocarbon is then passed through line 90 into mixer 93, thence into vessel 94 for water washing and subsequent separation as hereinbefore described. The neutralized, water washed hydrocarbon effluent is then fed through heater 98 into product debutanizer 99. This fractional distillation produces a distillate stream which is removed through line 100 at the rate of 345.50. This distillate stream has composition of 0.047 ethane, 6.522 propane, 86.487 isobutane, 6.775 n-butane, and 0.169 isopentane.

The debutanizer distillate is exchanged with bottoms from the deisobutanizer in exchanger 102 and fed into deisobutanizer 105 by means of inlet 103. Supplemental isobutane is introduced into the deisobutanizer through line 104 at the rate of 236.34, and it has a composition of 18.68 isobutane, 65.67 n-butane, and 15.65 isopentane. In the deisobutanizing fractional distillation a bottoms fraction flow of 211.15 is withdrawn through line 109, exchanger 102, and outlet 110, this bottoms fraction having composition of 1.317 isobutane, 80.941 n-butane, and 17.742 isopentane.

The overhead distillate flow from the deisobutanizer, 370.69, having composition of 0.044 ethane, 6.092 propane, 91.865 isobutane, and 1.999 n-butane, passes through line 106 and is split as hereinbefore described into alkylation zone feeds through line 14 and line 107. Line 107 goes to tankage 108 and is augmented by make-up isobutane (when necessary) entering line 9. Isobutane from tankage is passed through line 11 to the reaction zone as hereinbefore described.

Debutanizer bottoms are withdrawn through line 112, then heated in heater 114 and passed into fractionator 115. Herein light alkylate product having a boiling point up to 330° is removed as an overhead distillate at a rate of 286.76, while alkylate bottoms are withdrawn through line 116 at the rate of 30.7.

The plant consumes 172.29 barrels per hour of propylene, 2.92 barrels per hour of butylene, and 232.80 barrels per hour of isobutane, and it produces 306.9 barrels per hour of total alkylate having boiling point above that of $C_5$ hydrocarbons.

I claim:

In a process for catalytic isobutane-olefin alkylation wherein isobutane in molar excess and olefinic feed stock containing propane are contacted in liquid phase in an alkylation zone with a liquid catalyst under alkylating conditions and alkylation zone refrigeration is obtained by evaporation of lower boiling components including isobutane and propane from the resulting reaction mixture, the improvement which comprises: totally condensing said evaporated components forming a condensate comprising propane and isobutane, flashing said condensate forming chilled vapor enriched in propane and chilled liquid enriched in isobutane, separating said chilled vapor from said chilled liquid, passing said chilled liquid into the reaction mixture in said alkylation zone, condensing said chilled vapor forming a liquid enriched in propane, passing said liquid enriched in propane to a depropanizing distillation zone as the sole feed thereto, effecting separation of propane from remaining isobutane in said depropanizing distillation zone, and passing said remaining isobutane to said alkylation zone.

References Cited in the file of this patent

UNITED STATES PATENTS

| | | |
|---|---|---|
| 2,303,663 | Shankland | Dec. 1, 1942 |
| 2,429,205 | Jenny et al. | Oct. 21, 1947 |
| 2,649,486 | Putney | Aug. 18, 1953 |
| 2,865,971 | Beavon | Dec. 23, 1958 |
| 2,906,796 | Putney | Sept. 29, 1959 |

OTHER REFERENCES

Stratford Engineering Co., Oil and Gas Journal, vol. 55, No. 12, page 161, March 25, 1957.